Jan. 4, 1927.
B. A. AMES ET AL
1,612,791
SYSTEM OF COLOR STANDARDS
Filed July 13, 1922
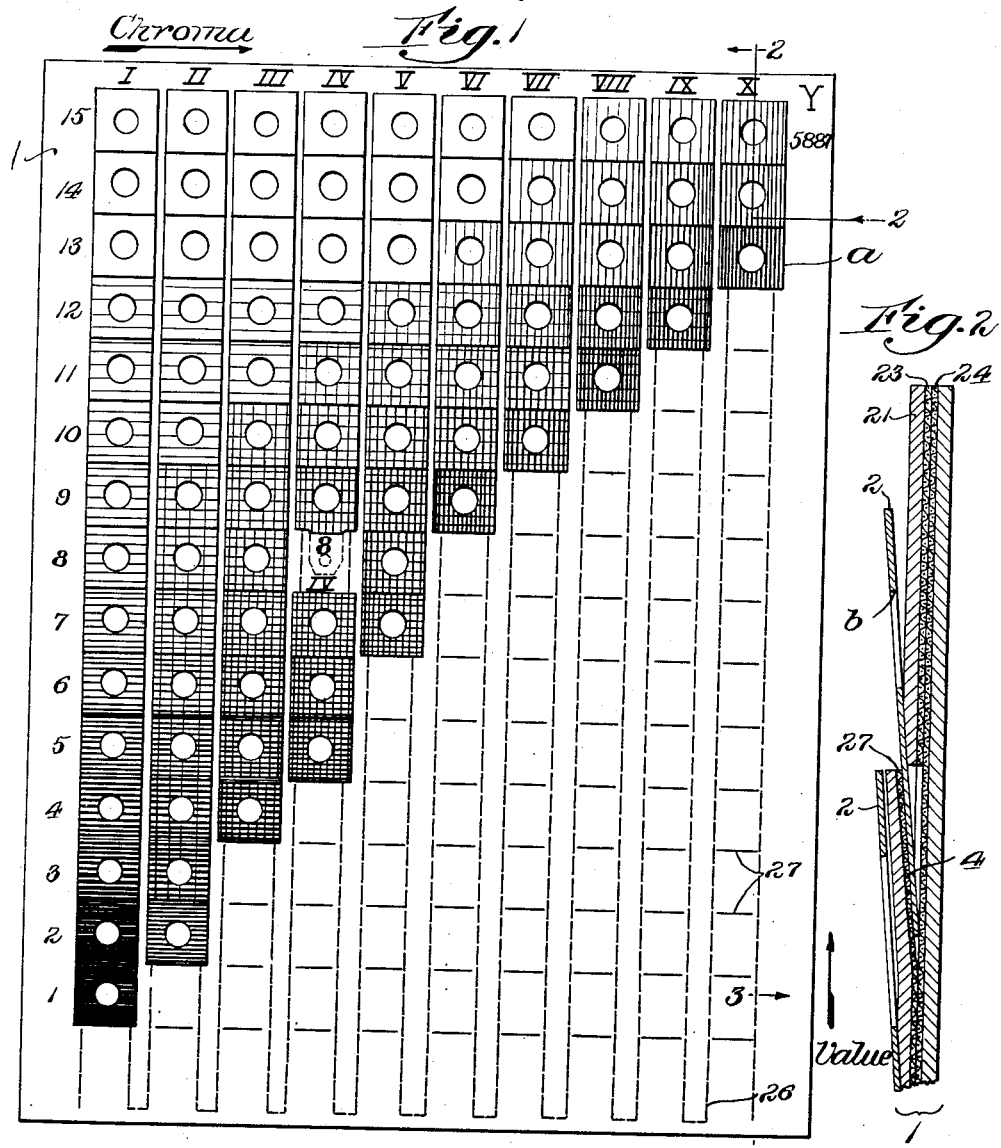
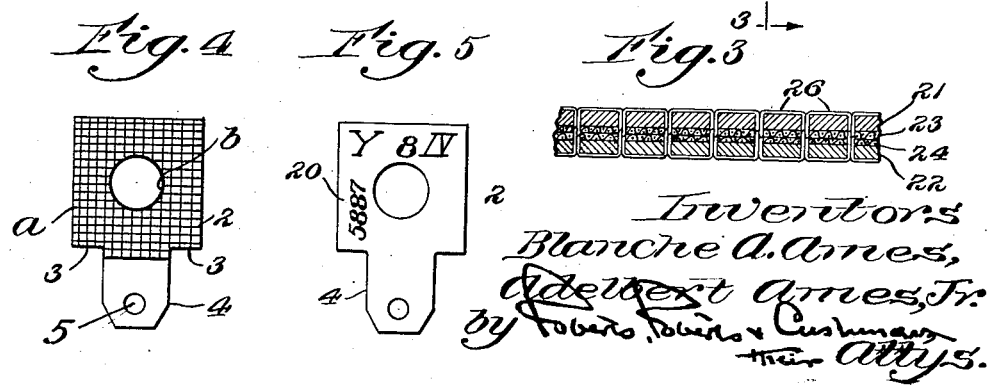

Patented Jan. 4, 1927.

1,612,791

UNITED STATES PATENT OFFICE.

BLANCHE AMES AMES, OF BOSTON, MASSACHUSETTS, AND ADELBERT AMES, JR., OF HANOVER, NEW HAMPSHIRE.

SYSTEM OF COLOR STANDARDS.

Application filed July 13, 1922. Serial No. 574,830.

This invention relates to a system of standards for the comparison of color, for the purpose of enabling the color of an object or surface to be determined in terms of a known and definite pigmented surface.

While there have been many suggestions in the prior art of methods of and devices for determining the specific color of a surface and of stating that specific color in terms capable definitely to identify the color refered to descriptively, so that the arts and industries may be informed by the description of the exact color, we are aware of no system of the sort of sufficient convenience, sufficient accuracy, and sufficient freedom from the requirement for skilled operation of the estimator of the color to reach the large field of utility waiting for some such system. Painters, whether industrial or artistic, decorators, dyers, dressmakers, potters, enamelers, electro-platers, printers of wall paper, textile fabrics and colored illustrative or display books, pictures or posters; weavers and finishers of textile fabrics; the makers of pigments, paints, dyes and stains, as well as many others practising the industrial arts are dependent upon guess-work or ocular estimation of the color of materials or of surfaces, in the absence of any accurate system of nomenclature, mensuration of the chromatic appearances, or other system of standards relating to color adapted to serve as the basis of communication from one artisan to another, and upon which the color of a surface can be accurately described. This is a considerable handicap in each of these arts.

We are aware that physicists have been able to analytically determine the quantitative components of a colored surface by the use of such instruments as the colorimeter, by the quantitative prismatic analysis of the light emitted by the surface to be measured, by comparison with combinations of color components combined by such devices as the Maxwell color disc, and by photometric measurements. But researches of this nature are out of reach of the class of persons to whom a workable color standard would be of the most practical assistance. We are also aware of various more or less scientific schemes for the production of a comparison standard by the use of a large number of indexed and arranged colored leaves or cards. The present invention belongs to the last mentioned class of device, and comprises a classified system of comparison cards arranged to be detached from the group to which they belong, and identified by a suitable symbol expressing the place of the particular card in the respective scales of value or absolute reflecting power; of hue or wave-length (which may also contain primary, secondary and tertiary compound wave-lengths); and of chroma or saturation (i. e. purity of color).

It is obvious that the utility and practical benefit of a system of standards of the kind referred to will depend upon its capacity to respond to demands made upon it by the relatively unskilled, first, to enable ready finding of a test or index card which matches in hue, in chroma, and in value the color of the surface, piece of cloth or whatever is to be expressed in terms of the standard; and second, upon the certainty with which the color so found can be related to others, and to a communicable notation referring to the particular value, chroma and hue of the matching index.

Objects of this invention are to provide a practicable standard of the individual and separable card character above referred to in which it will be as easy as possible to find any desired color in the standard; and in which it will be possible to tell in what direction, if any, any particular color varies from any selected specimen of the standard; and third, which shall provide a notation for the different index or comparison cards of the greatest simplicity and which will fix the position of the selected color in the standard, and which will inform those familiar with the system of a particular hue, chroma, and value of the color referred to by the notation only.

We shall describe the invention in connection with a particular specific form of appliance comprising a whole system made up of leaves or members each representing the scale steps in chroma and in value appropriate to one particular hue or wave-length to which that sheet or leaf is devoted, and characterized by an appropriate systematic arrangement and construction enabling an individual card which is the standard for a particular combination of value and chroma of the hue or wave-length to be removed from and returned to the chart or leaf.

In the accompanying drawings:

Fig. 1 is a face view of a sheet corresponding to one hue, and containing cards for each combination of chroma and value of that hue;

Fig. 2 is a section on the line 2—2 of Fig. 1;

Fig. 3 is a section on the line 3—3 of Fig. 1;

Fig. 4 is enlarged detail of the chromatic surface of one of the cards; and

Fig. 5 is a similar detail of the reverse surface of one of the cards.

Referring to Fig. 1, the system as a whole may comprise any desired sufficient number of sheets 1 to represent each necessary step in the scale of one of the three qualities of hue, chroma or value upon which the notation, mensuration and identification of color is based; by preference, a sufficient number of sheets to represent certain arbitrary points in the scale of wave-lengths of light; certain arbitrary secondary colors identified by two wave-lengths in different parts of the spectrum; and, if desired, by certain tertiary colors identified by mixtures or simultaneous emissions of three different wave-lengths in the spectrum. But one such sheet is shown on the drawings, since it is typical of any of the number chosen, but it will be understood that the entire standard comprises as many sheets like the sheet 1 as may be necessary, each sheet being devoted to the variations in chroma and in value, according to the selected scale, of a particular hue or wave-length.

In the instance shown the combinations, and therefore the number of separate comparison cards are built up by arbitrarily assuming fifteen stages of value and ten stages of chroma or purity of color. The orderly arrangement of these on the sheet representing the hue is of great importance; we prefer and recommend the arrangements shown in which the cards are arranged on the rectangular sheet in vertical parallel columns and also in horizontal parallel rows, the variations upward from row to row representing increasing illumination or value; and the variations from column to column from right to left representing decreasing purity or chroma.

According to such a standard the card bearing the color of the utmost purity and deepest value will be the last card to the right and toward the bottom of the sheet. If the horizontal rows are numbered from the bottom upward as shown from 1 to 15, and if the vertical rows are indicated by symbols alphabetically, or, as shown by the Roman numerals I to X, then we may refer to any card on the sheet, to indicate its position both on the sheet and in the respective scales of value and chroma, by giving the two coordinate numbers. For instance, the card indicated at $a$ in Fig. 1 is 13 X which means that this card is of the maximum purity of color (chroma X) and is two steps in value from the maximum (15). Bearing in mind that the maximum saturation obtainable in any pigment is far short of the theoretical saturation of the emitted light of the desired wave-length, the card 2 may well represent the maximum attainable purity of the selected hue. Let us suppose that the sheet 1 is the sheet referring to yellow of the wave-length of the sodium or D lines in the spectrum. The whole sheet shown in Fig. 1 then refers to variations based on yellow light of the wave-length .5887$\mu$, and the card 2 at $a$ bears a coating of a suitable pigment reflecting this color. As shown in Fig. 4, a preferred form of the standard indices 2 is a rectangular card, which preferably is provided with an opening $b$, so that the surface may be laid over or viewed by sighting against that color which is to be matched.

If the card at 13 X designated by $a$ is colored with the most saturated pigment of the desired wave-length, cards in the rows 14 and 15 respectively have surfaces pigmented with the pure color lightened by the addition of white. Or equivalently, these cards bear thinner films of a transparent pigment or dye on a white base. The steps from row to row in value may be evaluated in the first instance with the aid of a photometer, the scale from 1 to 15 representing evenly integrated steps in the scale from the darkest practicable pigment to the whitest practicable base, such as paper or sheet celluloid, of which the cards 2, Figs. 4 and 5 may be made. From right to left of the series of cards shown in Fig. 1, the purity of color of the pigmented surfaces falls off by a similar series of evaluated steps representing a proportional admixture with a pure pigment of a neutral gray corresponding in value to appropriate steps for the horizontal row in which the card is to be found. The card at 1—I is black; the card at 2—I is one step lighter and neutral, but in color contains the first or minimum admixture of the color of the column X; the card at 2—II is the same in value as the card at 2—I, but contains the second degree in step of admixture of the color. While impossible to indicate in the drawing these gradations, they have been diagrammed arbitrarily by indicating the chroma by vertical shading, and indicating the value by horizontal shading.

We regard the construction of the sheets and cards indicated as important to the utility of the system as a whole. The individual cards 2, beside having the opening $b$, are shouldered at 3 and provided with an integral tongue 4, which may be perforated at 5 for stringing a selected series. The chromatic surface is preferably on one side only of the card. The rear side is provided with the symbols 20 indicating the color, the value scale and the chroma scale of the particular card.

The sheets are preferably constructed (see Fig. 2) in laminated form, comprising a front sheet 21, a back sheet 22 and preferably cloth layers, 23, 24 fastened respectively to the front and back sheets. The sheets 21, 22 are of paper or indurated fibre to which the cloth backing 23, 24 is firmly glued. The laminated sheets 21, 23; 22, 24 are fastened together by rows of sewed lock stitches as indicated at 26 (see Fig. 3) these rows being evenly spaced and extending vertically. Between every other pair of rows the front laminated sheet 21, 23 is slotted at 27, Figs. 1 and 2, to form openings adapted to receive the integral projections for the individual cards 2.

The whole system in the gradations recommended contains about thirty-three hundred cards according to the arbitrary selection of steps in the wave-length of the spectrum and of the arbitrary choosing of secondary colors. Tertiary colors are so nearly represented by the modified chroma of primary and secondary colors that their inclusion is not recommended. We find that a satisfactory arrangement of steps for the hues or colors comprises 27 primary and secondary hues. The secondary colors included among these are found in the purples (admixtures of wave-lengths in the blue and in the red end of the spectrum) and in the browns (admixtures of wave-lengths in the green and in the red portions of the spectrum). The symbols on the backs of the cards 2 as shown in Fig. 3 may be arbitrarily chosen, for instance, yellow, as shown, being represented by Y, orange being represented by O, a yellow of a greater wave-length by O—Y (orange-yellow) and a yellow of a lesser wave-length by Y—O (yellow-orange), and so on. Preferably, in each instance the group of symbols identifying a hue, and a class of cards includes the wave-length, as .5887 for the yellow shown. If this were a mixture color such as a purple the symbol would contain both wave-lengths, as .4900–.6600 for example, to represent a purple compounded of the blue at the F line and the red at the C line of Fraünhofer's scale of the spectrum. But any other consistent designation of the component wave-lengths or notation of the elements of the color may be substituted within our invention.

What we claim is:

1. A system of color standards comprising distinct and separable colored standard indices arranged in classes, each class corresponding to one hue, the indices in said class representing orders of steps respectively of value and of chroma, there being one standard index for each combination of a particular step in value with each particular step in chroma.

2. A system of color standards comprising a sheet for each distinct different hue, and a separable standard index on each sheet for each combination of a predetermined number of steps in chroma within the hue with a predetermined number of steps in value within the hue.

3. A system of color standards arranged to group together the combinations of particular intensities, by steps, of chroma and of value of a particular hue, comprising a sheet supporting a class of separable standard indices arranged in columns according to the steps in chroma, and arranged within the columns in accordance with the steps in value.

4. A system of color standards providing a plurality of sheets corresponding in number to all of the distinct different hues with respect to which comparison is to be effected, each sheet being adapted and arranged to hold removably in visible position an orderly series of standard indices, each standard index in a column on the sheet being colored to correspond to one step in a scale of intensity of chroma or purity of the hue corresponding to the sheet, and each series in a column of standard indices corresponding to a particular step in chroma being colored according to a different value from the next in said series.

5. A sheet element for a system of color standards comprising a plurality of sheets joined together at intervals, one of the sheets being slotted between the junctures to provide seats for a portion of removable standard indices, in combination with index elements having tongues adapted to be inserted in and held by friction in said slots, and having a portion colored according to the chroma and value appropriate to the position of the index element on a sheet.

6. A standard index for a system of color standards having a colored surface, and a projection adapted to engage a slotted sheet.

7. In a system of color standards a sheet supporting a series of indices of the same hue arranged in a predetermined order in accordance with variations in chroma in one dimension and value in another dimension, each index having a body portion spaced from the supporting sheet and a sight opening in the said body portion.

8. In a system of color standards a sheet supporting a series of indices arranged in predetermined order in accordance with differences of color of the indices respectively, one portion of each index being supported in an opening in the sheet, another portion being spaced from the sheet and having a sight opening therein.

9. The combination of a sheet having a classification symbol thereon and having seats arranged in coordinate series respectively designated according to columns and lines, with a series of color standard indices bearing symbols designating the class, the line and the column in the holder to which the standard index belongs.

10. A system of color standards comprising a series of holders and a series of distinct and severally separable colored standard comparison elements arranged in classes, each class corresponding to one hue, the standard comparison elements in said classes representing orders of steps respectively of value and chroma, there being one standard comparison element for each combination of a particular step in value with each particular step in chroma.

11. A system of color standards arranged to group together the combinations of particular intensities by steps of chroma and of value of a particular hue, comprising a supporting sheet which carries a class of separable, colored, standard comparison elements arranged in columns according to steps in chroma and arranged within the columns in accordance with steps in value, each comparison element bearing symbols identifying its classification according to both chroma and value.

Signed at Boston, Massachusetts, this sixth day of July, 1922.

BLANCHE AMES AMES.

Signed at Hanover, New Hampshire, this 8th day of July, 1922.

ADELBERT AMES, Jr.